United States Patent
Oishi

(10) Patent No.: US 8,218,026 B2
(45) Date of Patent: Jul. 10, 2012

(54) IMAGING APPARATUS, IMAGING METHOD, REPRODUCING APPARATUS AND REPRODUCING METHOD, AND RECORDING MEDIUM FOR ASSOCIATING SOUND DATA WITH IMAGE DATA

(75) Inventor: Makoto Oishi, Kurokawa-gun (JP)

(73) Assignee: Fujifilm Corporation, Tokyo (JP)

( * ) Notice: Subject to any disclaimer, the term of this patent is extended or adjusted under 35 U.S.C. 154(b) by 327 days.

(21) Appl. No.: 12/453,770

(22) Filed: May 21, 2009

(65) Prior Publication Data

US 2009/0295948 A1 Dec. 3, 2009

(30) Foreign Application Priority Data

May 22, 2008 (JP) ................... 2008-134417

(51) Int. Cl.
*H04N 5/235* (2006.01)
*H04N 5/228* (2006.01)

(52) U.S. Cl. .................................... 348/222.1

(58) Field of Classification Search ............. 348/231.99, 348/231.2, 231.3, 231.4, 231.6, 222.1
See application file for complete search history.

(56) References Cited

U.S. PATENT DOCUMENTS

| | | | | |
|---|---|---|---|---|
| 5,600,765 A * | 2/1997 | Ando et al. | ................. | 345/668 |
| 5,980,124 A * | 11/1999 | Bernardi et al. | ............ | 396/428 |
| 6,133,904 A * | 10/2000 | Tzirkel-Hancock | ......... | 345/589 |
| 6,718,308 B1 * | 4/2004 | Nolting | ......................... | 704/275 |
| 2001/0008416 A1 * | 7/2001 | Misawa et al. | ................. | 348/207 |
| 2005/0151850 A1 * | 7/2005 | Ahn et al. | ................. | 348/207.99 |
| 2005/0177359 A1 * | 8/2005 | Lu et al. | ......................... | 704/200 |
| 2005/0190296 A1 * | 9/2005 | Kondo et al. | .................. | 348/565 |
| 2006/0028561 A1 * | 2/2006 | Tsunoda | ....................... | 348/239 |
| 2006/0082656 A1 * | 4/2006 | Ochiai | ...................... | 348/207.99 |
| 2006/0139462 A1 * | 6/2006 | Fukasawa et al. | .......... | 348/231.3 |
| 2006/0159445 A1 | 7/2006 | Ono et al. | | |
| 2007/0196028 A1 * | 8/2007 | Kokemohr et al. | ........... | 382/254 |
| 2007/0250901 A1 * | 10/2007 | McIntire et al. | .............. | 725/146 |

FOREIGN PATENT DOCUMENTS

| | | |
|---|---|---|
| JP | 6-133210 A | 5/1994 |
| JP | 2006-203860 | 8/2006 |
| JP | 2007-35121 A | 2/2007 |
| JP | 2007-174164 A | 7/2007 |
| JP | 2007-221498 | 8/2007 |
| JP | 2007-235432 | 9/2007 |
| JP | 2007-235432 A | 9/2007 |

OTHER PUBLICATIONS

Notification of Reasons for Rejection dated Feb. 15, 2012 (with an English translation).

* cited by examiner

*Primary Examiner* — Nicholas Giles
(74) *Attorney, Agent, or Firm* — McGinn IP Law Group, PLLC

(57) ABSTRACT

A sound is recorded when shooting a still image, an effect is applied on the still image in accordance with an analytical result of the recorded sound, and the sound and the effect-applied still image are recorded in association with each other, thereby allowing recording of the image having reality in addition to the sound. The still image and the sound are reproduced in association with each other, thereby allowing a viewer to feel an ambience and reality close to a memory that the photographer felt. Thus, image which easily reminds the situation and feeling during shooting can be recorded with a sound.

19 Claims, 22 Drawing Sheets

| SOUND-ANALYSIS RESULT | | | IMAGE EFFECT EXAMPLE | | |
|---|---|---|---|---|---|
| VOLUME | LENGTH | FREQUENCY | IMAGE QUALITY | GEOMETRICAL EFFECT | MOVEMENT |
| HIGH | LONG | HIGH | DEEPEN HUE, INCREASE SHARPNESS | RADIALLY AND FIRMLY BLUR | INCREASE RATE, INTENSIVELY SHIFT AND ROTATE IMAGE |
| HIGH | LONG | LOW | DEEPEN HUE, INCREASE CONTRAST | RADIALLY AND FIRMLY BLUR | DECREASE RATE, INTENSIVELY SHIFT AND ROTATE IMAGE |
| HIGH | SHORT | HIGH | INCREASE SHARPNESS | RADIALLY AND FIRMLY BLUR | INCREASE RATE, INTENSIVELY SHIFT AND ROTATE IMAGE |
| HIGH | SHORT | LOW | INCREASE CONTRAST | RADIALLY AND FIRMLY BLUR | DECREASE RATE, INTENSIVELY SHIFT AND ROTATE IMAGE |
| LOW | LONG | HIGH | SLIGHTLY DEEPEN HUE, SLIGHTLY INCREASE SHARPNESS | RADIALLY AND SLIGHTLY BLUR | INCREASE RATE, SLIGHTLY SHIFT AND ROTATE IMAGE |
| LOW | LONG | LOW | SLIGHTLY DEEPEN HUE, SLIGHTLY INCREASE CONTRAST | RADIALLY AND SLIGHTLY BLUR | DECREASE RATE, SLIGHTLY SHIFT AND ROTATE IMAGE |
| LOW | SHORT | HIGH | SLIGHTLY INCREASE SHARPNESS | RADIALLY AND SLIGHTLY BLUR | INCREASE RATE, SLIGHTLY SHIFT AND ROTATE IMAGE |
| LOW | SHORT | LOW | SLIGHTLY INCREASE CONTRAST | RADIALLY AND SLIGHTLY BLUR | DECREASE RATE, SLIGHTLY SHIFT AND ROTATE IMAGE |

FIG.6A

| SOUND-ANALYSIS RESULT | | | IMAGE EFFECT EXAMPLE | | |
|---|---|---|---|---|---|
| VOLUME | LENGTH | FREQUENCY | IMAGE QUALITY | GEOMETRICAL EFFECT | MOVEMENT |
| HIGH | LONG | HIGH | DEEPEN HUE, INCREASE SHARPNESS | RADIALLY AND FIRMLY BLUR | INCREASE RATE, INTENSIVELY SHIFT AND ROTATE IMAGE |
| HIGH | LONG | LOW | DEEPEN HUE, INCREASE CONTRAST | RADIALLY AND FIRMLY BLUR | DECREASE RATE, INTENSIVELY SHIFT AND ROTATE IMAGE |
| HIGH | SHORT | HIGH | INCREASE SHARPNESS | RADIALLY AND FIRMLY BLUR | INCREASE RATE, INTENSIVELY SHIFT AND ROTATE IMAGE |
| HIGH | SHORT | LOW | INCREASE CONTRAST | RADIALLY AND FIRMLY BLUR | DECREASE RATE, INTENSIVELY SHIFT AND ROTATE IMAGE |
| LOW | LONG | HIGH | SLIGHTLY DEEPEN HUE, SLIGHTLY INCREASE SHARPNESS | RADIALLY AND SLIGHTLY BLUR | INCREASE RATE, SLIGHTLY SHIFT AND ROTATE IMAGE |
| LOW | LONG | LOW | SLIGHTLY DEEPEN HUE, SLIGHTLY INCREASE CONTRAST | RADIALLY AND SLIGHTLY BLUR | DECREASE RATE, SLIGHTLY SHIFT AND ROTATE IMAGE |
| LOW | SHORT | HIGH | SLIGHTLY INCREASE SHARPNESS | RADIALLY AND SLIGHTLY BLUR | INCREASE RATE, SLIGHTLY SHIFT AND ROTATE IMAGE |
| LOW | SHORT | LOW | SLIGHTLY INCREASE CONTRAST | RADIALLY AND SLIGHTLY BLUR | DECREASE RATE, SLIGHTLY SHIFT AND ROTATE IMAGE |

FIG.6B

| SHAKE-ANALYSIS RESULT | | IMAGE EFFECT EXAMPLE | | |
|---|---|---|---|---|
| SNAKE AMOUNT | FREQUENCY | IMAGE QUALITY | GEOMETRICAL EFFECT | MOVEMENT |
| LARGE | HIGH (FAST) | DEEPEN HUE, INCREASE SHARPNESS | RADIALLY AND FIRMLY BLUR | INCREASE RATE, INTENSIVELY SHIFT AND ROTATE IMAGE |
| LARGE | LOW (SLOW) | DEEPEN HUE, INCREASE CONTRAST | RADIALLY AND FIRMLY BLUR | DECREASE RATE, INTENSIVELY SHIFT AND ROTATE IMAGE |
| SMALL | HIGH (FAST) | SLIGHTLY DEEPEN HUE, SLIGHTLY INCREASE SHARPNESS | RADIALLY AND SLIGHTLY BLUR | INCREASE RATE, SLIGHTLY SHIFT AND ROTATE IMAGE |
| SMALL | LOW (SLOW) | SLIGHTLY DEEPEN HUE, SLIGHTLY INCREASE CONTRAST | RADIALLY AND SLIGHTLY BLUR | DECREASE RATE, SLIGHTLY SHIFT AND ROTATE IMAGE |

FIG.6C

| PRESSURE-ANALYSIS RESULT | | IMAGE EFFECT EXAMPLE | | |
|---|---|---|---|---|
| PRESSURE | VARIATION | IMAGE QUALITY | GEOMETRICAL EFFECT | MOVEMENT |
| HIGH | FAST | DEEPEN HUE, INCREASE SHARPNESS | RADIALLY AND FIRMLY BLUR | INCREASE RATE, INTENSIVELY SHIFT AND ROTATE IMAGE |
| HIGH | SLOW | DEEPEN HUE, INCREASE CONTRAST | RADIALLY AND FIRMLY BLUR | DECREASE RATE, INTENSIVELY SHIFT AND ROTATE IMAGE |
| LOW | HIGH (FAST) | SLIGHTLY DEEPEN HUE, SLIGHTLY INCREASE SHARPNESS | RADIALLY AND SLIGHTLY BLUR | INCREASE RATE, SLIGHTLY SHIFT AND ROTATE IMAGE |
| LOW | LOW (SLOW) | SLIGHTLY DEEPEN HUE, SLIGHTLY INCREASE CONTRAST | RADIALLY AND SLIGHTLY BLUR | DECREASE RATE, SLIGHTLY SHIFT AND ROTATE IMAGE |

FIG.6D

| THERMAL ANALYSIS RESULT | | IMAGE EFFECT EXAMPLE | | |
|---|---|---|---|---|
| TEMPERATURE | VARIATION | IMAGE QUALITY | GEOMETRICAL EFFECT | MOVEMENT |
| HIGH | FAST | DEEPEN HUE, INCREASE SHARPNESS | RADIALLY AND FIRMLY BLUR | INCREASE RATE, INTENSIVELY SHIFT AND ROTATE IMAGE |
| HIGH | SLOW | DEEPEN HUE, INCREASE CONTRAST | RADIALLY AND FIRMLY BLUR | DECREASE RATE, INTENSIVELY SHIFT AND ROTATE IMAGE |
| LOW | HIGH (FAST) | SLIGHTLY DEEPEN HUE, SLIGHTLY INCREASE SHARPNESS | RADIALLY AND SLIGHTLY BLUR | INCREASE RATE, SLIGHTLY SHIFT AND ROTATE IMAGE |
| LOW | LOW (SLOW) | SLIGHTLY DEEPEN HUE, SLIGHTLY INCREASE CONTRAST | RADIALLY AND SLIGHTLY BLUR | DECREASE RATE, SLIGHTLY SHIFT AND ROTATE IMAGE |

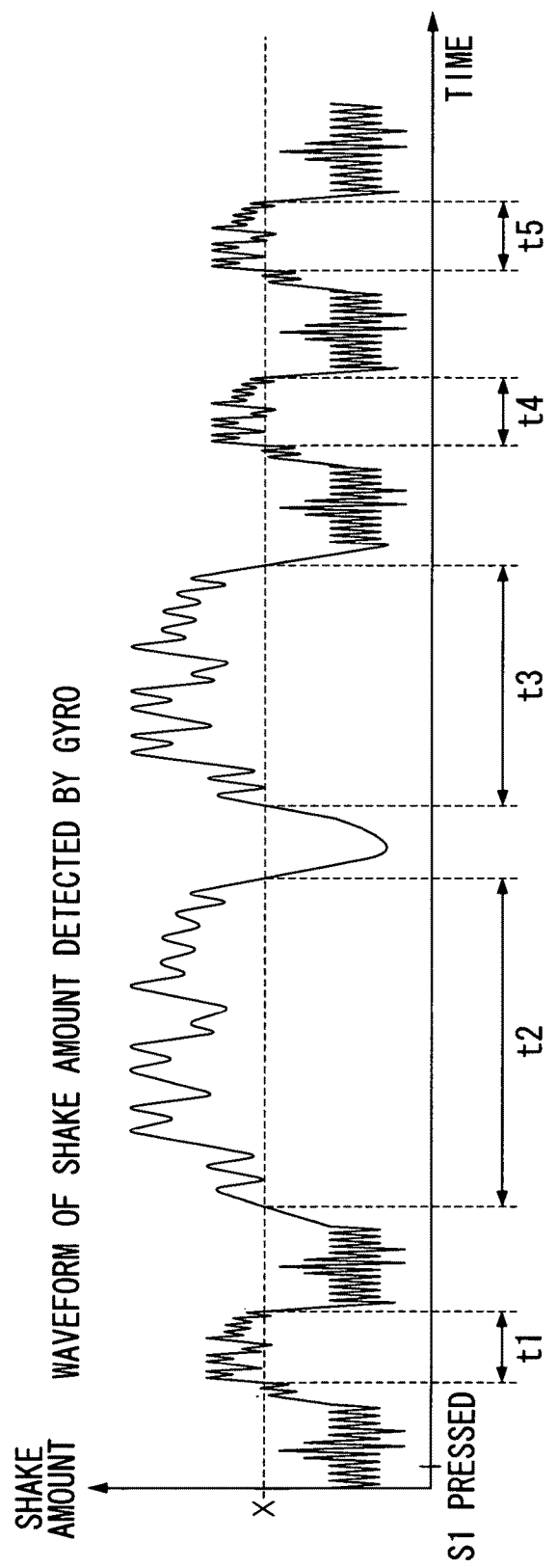

IMAGING APPARATUS, IMAGING METHOD, REPRODUCING APPARATUS AND REPRODUCING METHOD, AND RECORDING MEDIUM FOR ASSOCIATING SOUND DATA WITH IMAGE DATA

BACKGROUND OF THE INVENTION

1. Field of the Invention

The present invention relates to a technique for executing various kinds of processings on captured images according to a situation at which a subject is photographed.

2. Description of the Related Art

An imaging apparatus according to Japanese Patent Application Laid-Open No. 2006-203860 includes: an imaging unit for capturing an image of a subject; a recording unit for recording a sound surrounding the imaging unit; a threshold sound volume storage unit for storing a specified threshold sound volume; a sound extraction unit for extracting a sound within a part of period including a sound having the volume larger than the threshold sound volume stored in the threshold sound volume storage unit among the sound recorded by the recording unit; a data storage unit for associating each of a plurality of images captured by the imaging unit with each of a plurality of sounds extracted by the sound extraction unit in the order of imaging and recording, and for storing the same; and a data output unit for outputting the captured image and the sound, which the data storage unit has stored in association with each other, in synchronization with each other.

In a camera according to Japanese Patent Application Laid-Open No. 2007-221498, music and a sample image suitable for the music are recorded in a first memory. A similarity detecting section of a similar image selecting unit refers to first auxiliary data or second auxiliary data of the sample image and detects a photographed image that resembles the sample image among photographed images recorded in a second memory. When a proper photographed image can not be detected, the sample image is selected. When reproducing music and image, a selected similar image is reproduced in place of the sample image in accordance with the progress of the music.

A camera according to Japanese Patent Application Laid-Open No. 2007-235432 records sounds inputted by a sound input device according to continuous shooting control on a plurality of still images (A-D) by a continuous shooting control device; and stores and manages, among the plurality of continuously photographed still images (A-D), the still image (B) which has been photographed when a sound level determining device determined that an actual sound exceeding a certain level was inputted, and sound data recorded by a sound recording device in association with each other. Even for reproducing individual still image data with sounds, the camera can reproduce and output the recorded sound data only when the still image (B) photographed at the timing when the sounds was actually produced is reproduced and displayed, thus reproducing individual still images with sounds without strange feeling.

SUMMARY OF THE INVENTION

The conventional imaging apparatus such as a digital still camera records a momentary image, and records images and sounds in a certain time period. One of the most important purposes of a user using the camera is "recording a memory." However, since a human memory is made up of not only images at the situation but also various senses such as sounds, odors, touches and tastes, it is difficult for the user to vividly recollect the reality only with a captured image.

In view of this point, according to Japanese Patent Application Laid-Open No. 2006-203860, a sound is extracted in shooting in accordance with the sound volume of sound data to be reproduced on concurrent recording/reproducing of still images and sounds. However, the feature of the sound is not utilized for reproducing the image at all.

According to Japanese Patent Application Laid-Open No. 2007-221498, images similar to a sample image are retrieved among previously-recorded captured images, music data and dedicated sample images, and the retrieved images are reproduced in synchronization with the reproduction of the music. However, since the previously recorded music is used, the music does not always match with the shooting situation of the image, and it is difficult to represent the reality during the shooting. Furthermore, whenever the same sample image is selected, the same image and music is reproduced, expressing unvarying tiredness.

In Japanese Patent Application Laid-Open No. 2007-235432, Continuous-shot images and sounds are recorded. When the sound is louder or equal to a certain threshold, the sound and the image captured at the same time are associated with each other and recorded. However, a part where the sound becomes loud is not always appropriate for the still image expressing the reality at the shooting situation. Instead, it is preferable that a user decides the shooting timing.

Accordingly, the present invention aims to record, with a sound, an image which easily reminds the situation and feeling during shooting.

An imaging apparatus according to an aspect of the present invention comprises: an imaging unit which converts an electric signal into image data and outputs the image data, the electric signal being acquired by an image pickup element photoelectrically converting light from a subject image-formed through an imaging lens on a photosensitive surface of the image pickup element; a sound acquiring unit which converts a sound around the subject into sound data and outputs the sound data; a sound analyzing unit which analyzes a feature of the sound based on the sound data outputted from the sound acquiring unit; an effect application unit which applies an effect on the image data outputted from the imaging unit, the effect being image processing in accordance with the feature of the sound analyzed by the sound analyzing unit; and a recording unit which associates the image data generated by applying the effect by the effect application unit with the sound data outputted from the sound acquiring unit and records the image data and the sound data on a prescribed recording medium.

The effect can include image processing which changes at least one of a hue, sharpness, contrast and blurredness of the image.

The sound analyzing unit can extract a sound volume, a frequency, or a time-series variation thereof as a feature of the sound, compares the extracted feature of the sound with a previously-stored feature pattern, and applies the effect which is previously associated with a feature pattern matching the extracted feature of the sound.

The imaging apparatus can further comprise a sound acquisition control unit which controls a timing of a start, a stop or a termination of conversion and output of the sound data by the sound acquiring unit in accordance with the feature of the sound analyzed by the sound analyzing unit.

The sound acquisition control unit can start outputting the sound data when detecting that the volume of the sound becomes larger than or equal to a prescribed value, terminates outputting the sound data when outputting the sound data over a prescribed first time period, and stops outputting the sound data when the volume of the sound falls equal to or below the prescribed value and the falling continues over a prescribed second time period.

The imaging apparatus can further comprise a moving image creating unit which creates image frames of a moving image by applying a plurality of different effects on the image data outputted from the imaging unit, and creates moving image data based on the image frames. And, the recording unit associates the moving image data created by the moving image creating unit and the sound data with each other and records the associated data.

The imaging apparatus can further comprise a continuous shooting control unit which controls the imaging unit to output a prescribed count of image data at prescribed time intervals. And, the effect application unit executes image processing on the prescribed count of image data outputted from the imaging unit using the image data and another image data captured before and/or after the image data in accordance with control of the continuous control unit.

The imaging apparatus can further comprise a sound editing unit which edits a content of the sound data from the sound acquiring unit in accordance with the feature of the sound analyzed by the sound analyzing unit.

The sound editing unit can perform at least one of extracting a specific frequency from the sound data, eliminating noise, extracting a sound of a specific person, and cutting off sound data whose sound volume does not reach a prescribed sound volume.

The imaging apparatus can further comprise a detection unit which detects a physical status of the imaging apparatus. And, the effect application unit applies the effect in accordance with the physical status detected by the detection unit.

The effect application unit can apply a specific effect in accordance with a specific physical status detected by the detection unit.

The effect application unit can at least one of a magnification ratio, a zooming speed, an amount of shift, a shift rate, turning ratio, and turning speed in the processing of the effect on the image in accordance with a variation of the volume of the sound or a rate of variation of the sound.

The present invention also includes a reproducing apparatus reproducing image data and sound data in association with each other, the image data and sound data recorded on the prescribed recording medium by the imaging apparatus.

An imaging method according to another aspect of the present invention comprises: converting an electric signal into image data and outputting the image data, the electric signal being acquired by an image pickup element photoelectrically converting light from a subject image-formed through an imaging lens on a photosensitive surface of the image pickup element; converting a sound around the subject into sound data and outputting the sound data; analyzing a feature of the sound based on the outputted sound data; applying an effect on the outputted image data, the effect being image processing in accordance with the analyzed feature of the sound; and associating the image data generated by applying the effect with the outputted sound data and recording the image data and the sound data on a prescribed recording medium.

The present invention also includes a reproducing method reproducing the image data and the sound data in association with each other, the image data and sound data recorded on the prescribed recording medium by the imaging method.

The present invention also includes a recording medium on which a program is stored, the program comprising computer-executable instructions of: acquiring image data and sound data recorded concurrently with the image data; analyzing a feature of the sound based on the sound data; applying an effect on the image data, the effect being image processing in accordance with the analyzed feature of the sound; and reproducing image data generated by applying the effect and the sound data in association with each other.

Accordingly, a sound is recorded when shooting a still image, an effect is applied on the still image in accordance with an analytical result of the recorded sound, and the sound and the effect-applied still image are recorded in association with each other, thereby allowing recording of the image having reality in addition to the sound. Further, the still image and the sound are reproduced in association with each other, thereby allowing a viewer to feel an ambience and reality close to a memory that the photographer felt.

BRIEF DESCRIPTION OF THE DRAWINGS

FIGS. 6A to 6D show an example of association between an analytical result on a sound and an effect processing to be executed by the image effector 152 in response to notification of the analytical result on the sound;

FIG. 10 shows examples of an effect processing of zooming-in;

FIG. 13 schematically shows time-series variations in shake amount;

DETAILED DESCRIPTION OF THE PREFERRED EMBODIMENTS

First Exemplary Embodiment

A best mode of preferred embodiments realized in an imaging apparatus according to the present invention will be described below with reference to the accompanying drawings.

Figure 1:
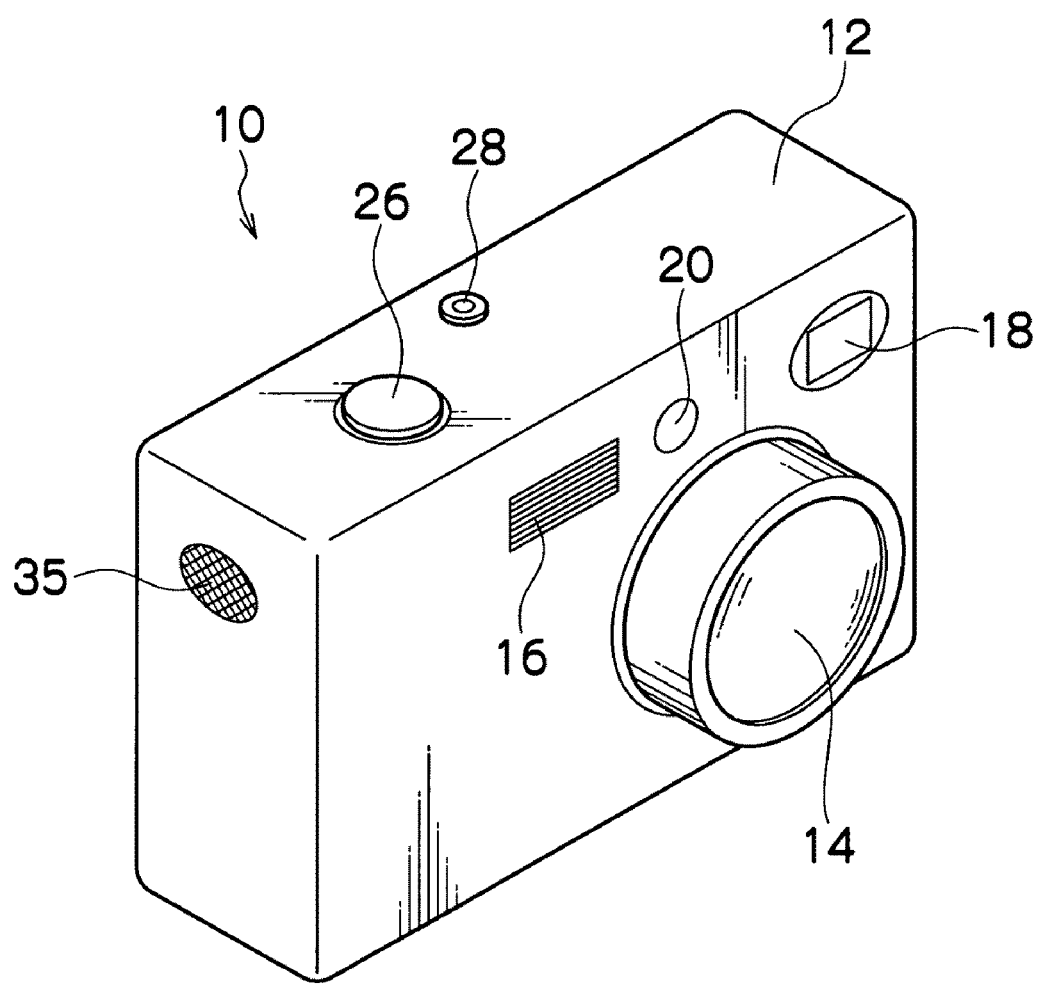
FIG. 1 is a perspective view of the front face of a digital camera.
Figure 2:
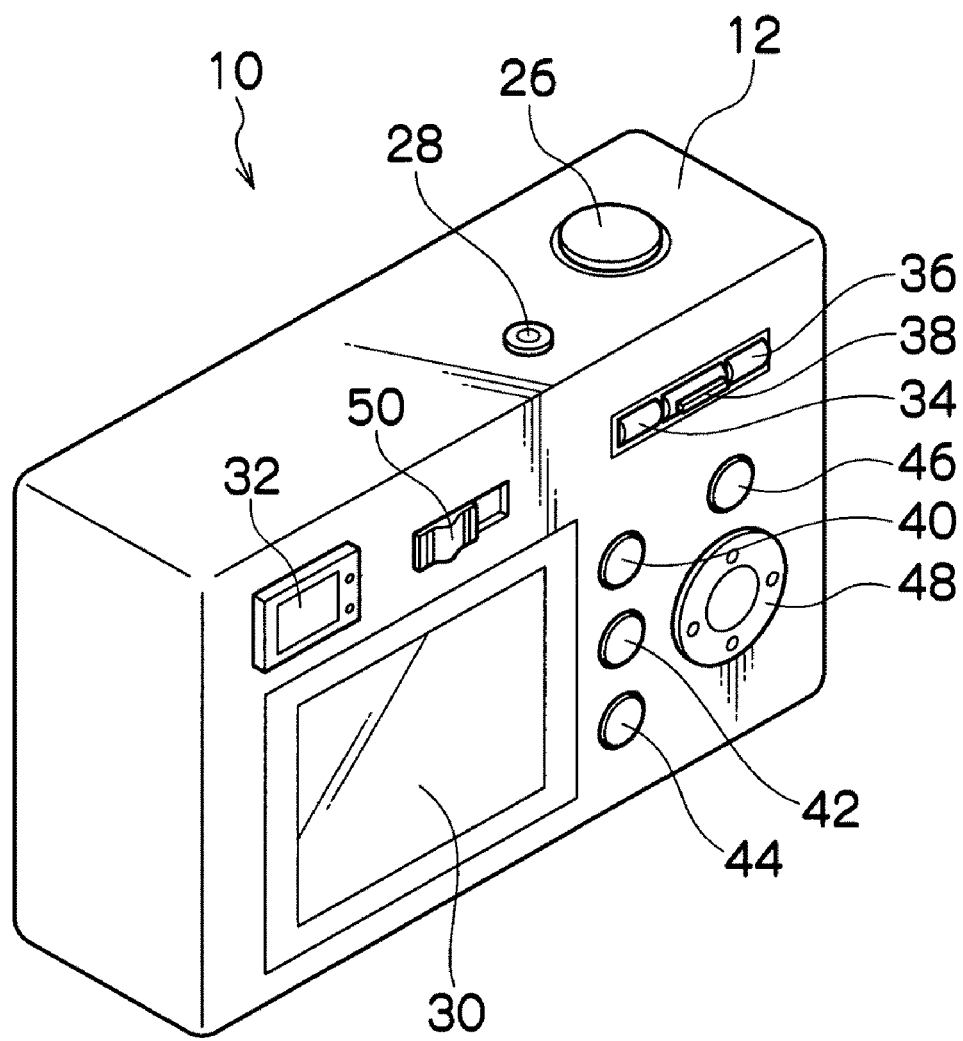
FIG. 2 is a perspective view of the rear face of the digital camera.

FIGS. 1 and 2 show perspective views of the front and rear faces, respectively, of a digital camera 10 to which the present invention is applied.

As shown in FIG. 1, on the front face of a camera body 12, there are disposed a lens 14, an electronic flash 16, a microphone 17, a view finder 18, a self-timer lamp 20 and so forth, and a shutter release button 26, a power switch button 28 and so forth are disposed on the top face. The microphone 17 records sounds simultaneously when moving images or still images are acquired. A loudspeaker 35 is disposed on a side face of the camera body 12. The loudspeaker 35 outputs a shutter click when the shutter release button 26 is pressed, and outputs a sound associated with images when the images are reproduced.

As shown in FIG. 2, on the rear face of the camera body 12, there are disposed a monitor 30, a view finder eyepiece 32, a flash lighting button 34, a macro button 36, a zooming lever 38, a display button 40, a BACK button 42, a menu/OK button 44, a cross button 48, a mode selector switch 50 and so forth.

The shutter release button 26 is configured of a two-step stroke switch which permits half pressing and full pressing. Half pressing of this shutter release button 26 actuates the AE/AF (Auto Exposure/Auto Focus) function of the camera, and an image is photographed when the button is full-pressed.

The monitor 30 includes a liquid crystal display capable of color displaying. The monitor 30 is used as a display screen for both recorded pictures and user interfacing. The monitor 30 also serves as an electronic view finder for confirming the angle of view when an image is photographed. The display button 40 functions as a button to instruct changing of the displayed content on the monitor 30.

The electronic flash button 34 functions as a button which instructs to change over the electronic flash mode. Each time the electronic flash button 34 is pressed, the electronic flash mode in use when an image is photographed is changed over from "Auto Electronic Flash" to "Anti-Red Eye Electronic Flash", "Forced Electronic Flash Lighting", "Slow Synchronization" and "Prohibit Electronic Flash Lighting" in that sequence.

The macro button 36 functions as a button to instruct ON/OFF switching of the macro function. Each time the macro button 36 is pressed, the macro function to be used when an image is photographed is turned on or off.

The zooming lever 38 functions as a lever to instruct zooming (in or out) on the subject whose image is to be photographed, and also functions as a lever to instruct zooming (enlarging or reducing) the displayed image when reproducing. The zooming lever 38 is swingable up and down. Turning it upward results in zooming in, while turning it downward results in zooming out.

The menu/OK button 44 functions as a button to instruct transition from a normal screen to a menu screen in each mode (menu button), and also functions as a button to make definite a choice and to instruct its execution (OK button). The BACK button 42 functions as a button to instruct cancellation of an input operation or the like.

The cross button 48 functions as a button to enter instructions in four directions, up and down, right and left, and is used for selecting any item on a menu screen or other similar purposes.

The mode selector switch 50 functions as a switch which instructs to change modes, and is slidably provided between "Shooting Position" and "Playback Position". When the mode selector switch 50 is turned to its "Shooting Position", the digital camera 10 is set to the "Shooting Mode", or when it is turned to its "Playback Position", the camera is set to the "Playback Mode".

Figure 3:
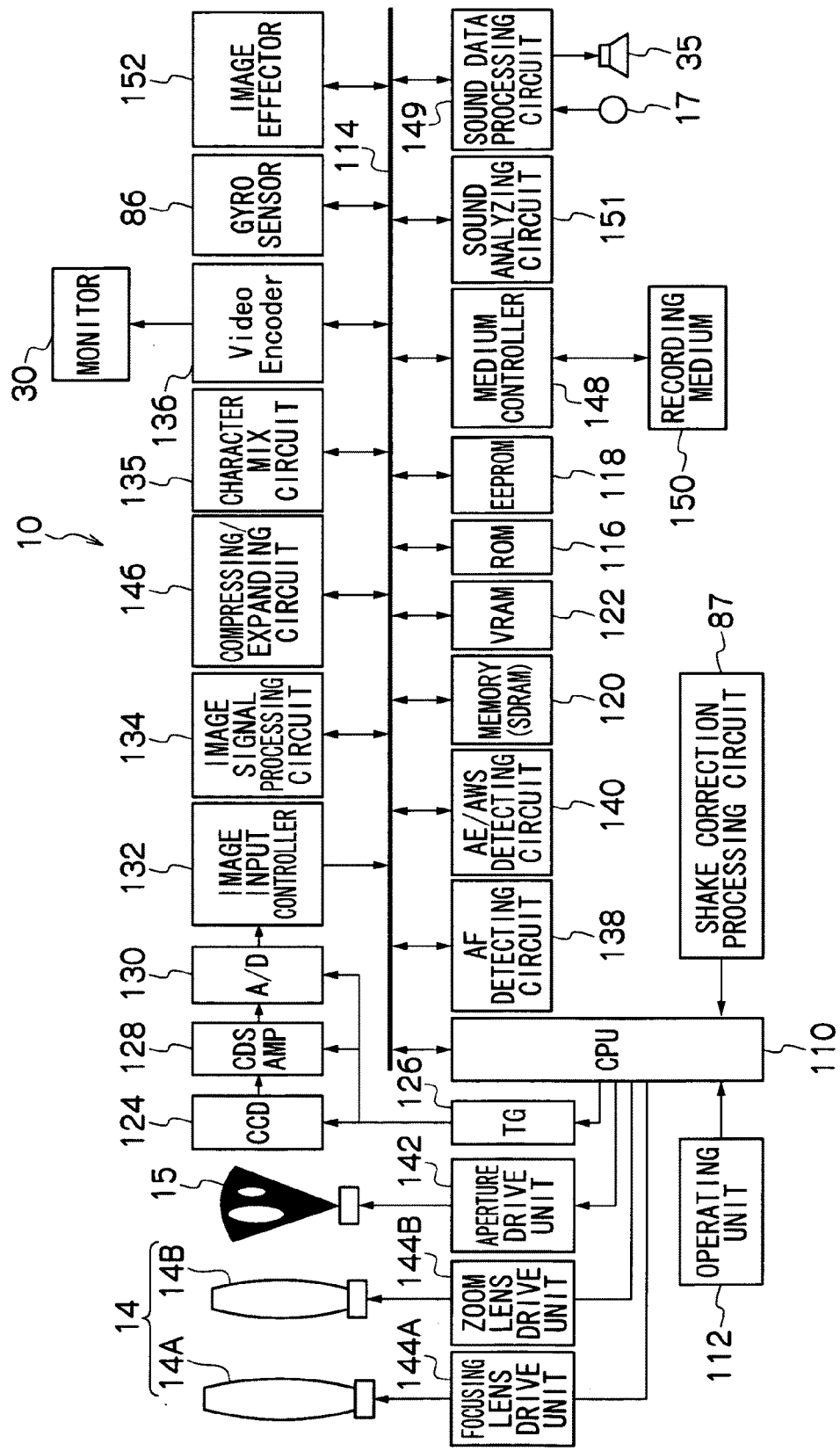
FIG. 3 is a block diagram showing the internal configuration of the digital camera.

FIG. 3 is a block diagram schematically illustrating the internal configuration of the digital camera 10 shown in FIGS. 1 and 2.

The overall operation of the digital camera 10 is under the integrated control of a central processing unit (CPU) 110. The CPU 110 controls the camera system under prescribed programs on the basis of input information from an operating unit 112 (including the shutter release button 26, power switch button 28, electronic flash button 34, macro button 36, zooming lever 38, display button 40, BACK button 42, menu/OK button 44, cross button 48 and mode selector switch 50).

A ROM 116 connected to the CPU 110 via a bus 114 stores programs executed by the CPU 110 and various data and the like necessary for control, and an EEPROM 118 stores various items of setting information regarding the operation of the digital camera 10, including folder management information. A memory (SDRAM) 120 is used not only as the area for arithmetic operations by the CPU 110 but also as that for temporary storage of image data and sound data. A VRAM 122 is used as a temporary storage area dedicated to image data.

The digital camera 10 is enabled to photograph an image when the mode selector switch 50 is set to the shooting mode, and power is then supplied to the imaging unit including a charge coupled device (CCD) 124.

Light having passed the lens 14 forms an image on the light receiving face of the CCD 124 via an aperture stop 15. Many photodiodes (light receiving elements) are two-dimensionally arranged on the light receiving face of the CCD 124, and primary color filters of red (R), green (G) and blue (B) matching the photodiodes are arranged in a prescribed arrangement structure (such as Bayer, G stripe or else). The CCD 124 has an electronic shutter function to control the duration of electric charge accumulation in the photodiodes (shutter speed), and the CPU 110 controls the duration of electric charge accumulation in the CCD 124 via a timing generator 126.

The image of the subject formed on the light receiving face of the CCD 124 is converted by the photodiodes into signal charges matching the quantity of incident light. The signal charges accumulated in the respective photodiodes are successively read out in accordance with an instruction from the CPU 110 as voltage signals (image signals) matching the signal charges on the basis of drive pulses provided by the timing generator 126.

The image signals outputted from the CCD 124 are delivered to an analog processing unit (CDS/AMP) 128, where R, G and B signals for individual pixels, after being subjected to sampling hold (correlated double sampling processing), are amplified and fed to an A/D converter 130.

The A/D converter 130 converts R, G and B signals outputted from the analog processing unit 128 into digital R, G and B signals. The digital R, G and B signals outputted from the A/D converter 130 are stored into the memory 120 via an image input controller 132.

An image signal processing circuit 134 processes R, G and B signals stored in the memory 120 in accordance with instructions from the CPU 110. More specifically, the image signal processing circuit 134 functions as image processing device containing a synchronizing circuit (a processing circuit for interpolating spatial discrepancies of color signals entailed by the color filter arrangement of one-charged CCD and converting the color signals into simultaneous signals), a white balance correction circuit, a gamma correction circuit, a contour correction circuit and a luminance/color differential signal generating circuit, and performs a prescribed signal processing in accordance with instructions from the CPU 110 while utilizing the memory 120. R, G and B signals entered into the image signal processing circuit 134 are converted into luminance signals (Y signals) and color differential signals (Cr and Cb signals) by the image signal processing circuit 134 and, after going through a prescribed processing including gamma correction, are stored into the VRAM 122.

When a captured image is to be displayed on the monitor 30, the image is delivered from the VRAM 122 to a video encoder 136 via a character MIX circuit 135. The video encoder 136 converts the entered image data into signals of a prescribed formula for the displaying purpose (e.g. color composite video signals of the NTSC (National Television System Committee) system) and supplies the converted signals to the monitor 30. Thus, the image captured by the CCD 124 is displayed on the monitor 30.

By periodically taking in image signals from the CCD 124, replacing periodically image data in the VRAM 122 with image data generated from those image signals, and supplying those replacing image data to the monitor 30, an image captured by the CCD 124 is displayed on a real time basis. The photographer can confirm the angle of view by looking at this picture displayed on the monitor 30 on a real time basis (through image).

A gyro sensor 86 activates when the operational mode of the digital camera 10 is the still image shooting mode or the moving image shooting mode, detects rotation of the camera body 12 and supplies the detected rotation as a rotational signal to a shake correction processing circuit 87.

The shake correction processing circuit 87 computes the magnitude of vibration of the camera body 12 on the basis of the rotational signal when the operational mode is the still image shooting mode or the moving image shooting mode, supplies a correction signal to cancel the vibration to a movable stage (not shown) on which the CCD 124 is mounted, and corrects shakes in the through image and the actual image (image to be actually photographed) by moving the CCD 124 together with the movable stage.

The character MIX circuit 135 combines prescribed characters and symbolic data supplied from the memory 120 with the image data supplied from the VRAM 122 in accordance with commands from the CPU 110, and supplies the synthesized image data to the video encoder 136. Thus, the through image on which information including characters and symbols are superposed is displayed.

When the operational mode is the still image shooting mode or the moving image shooting mode, an analog sound signal acquired by the microphone 17 is amplified by a sound data processing circuit 149, and then converted into digital data and data processing, for instance compression in a prescribed compression recording system (MP3 etc.), is executed on the converted data. The processed data is temporarily stored on the SDRAM 120 and then recorded on a recording medium 150 together with the acquired image. Recorded sound data stored on the SDRAM 120 or the recording medium 150, and various kinds of notifying sound data including an operational sound, a shutter click sound, a focusing sound of AF and so forth stored previously on the EEPROM 118 are subjected to data processing including decoding, analog sound signal conversion and amplification by the sound data processing circuit 149, and then supplied to the loudspeaker 35. The loudspeaker 35 outputs the sound in accordance with the analog sound signal supplied by the sound data processing circuit 149.

Photographing is performed by pressing down the shutter release button 26. When the shutter release button 26 is half-pressed first, an S1-on signal is entered into the CPU 110, and the CPU 110 starts an AE/AF processing.

First, the image signals taken in from the CCD 124 via the image input controller 132 are entered into an AF detecting circuit 138 and an AE/AWB (Auto Exposure/Auto White Balance) detecting circuit 140.

The AE/AWB detecting circuit 140, which includes a circuit which divides each frame into a plurality of areas (e.g. 16×16) and cumulatively adds the R, G and B signals in each divided area, provides the cumulative sums to the CPU 110. The CPU 110 detects the brightness of the subject (subject luminance) on the basis of the cumulative sums acquired from the AE/AWB detecting circuit 140, and computes the exposure value (photographic EV) suitable for the photographing. Then the CPU 110 determines the aperture stop value and the shutter speed from the figured-out photographic EV and prescribed program lines, and accordingly controls the electronic shutter release of the CCD 124 and an aperture drive unit 142 to achieve an appropriate quantity of exposure.

When the white balance is automatically adjusted, the AE/AWB detecting circuit 140 computes the average cumulative sums of the R, G and B signals separately for each color and for each divided area, and provides the computed results to the CPU 110. The CPU 110 calculates the R/G and B/G ratios in each divided area from the acquired cumulative sums of R, B and G, and determines the type of light source on the basis of the distribution of the calculated R/G and B/G values in the color spaces of R/G and B/G and so on. Then according to the white balance adjustment value suitable for the determined type of light source, the gains values of the white balance adjusting circuit for the R, G and B signals (white balance correction values) are controlled, for instance to make the value of each ratio approximately 1 (i.e. the cumulative RGB ratio per frame R:G:B≅1:1:1), and signals on the each color channel are corrected.

The AF detecting circuit 138 includes a high pass filter which passes only the high frequency component of G signals, an absolutizing unit, an AF area extracting unit for cutting out signals in a prescribed focus area (e.g. the central area of the frame), and an accumulating unit for cumulatively adding absolute value data in the AF area, and the data of cumulative sums calculated by the AF detecting circuit 138 is notified to the CPU 110. The CPU 110, while controlling a focusing lens drive unit 144A to shift a focusing lens 14A, computes focus evaluation values (AF evaluation values) at a plurality of AF detection points, and determines the lens position where the evaluation value is the local maximum as the in-focus position. Then the CPU 110 so controls the focusing lens drive unit 144A so as to shift the focusing lens 14A to the in-focus position so determined.

Thus, in response to the half pressing of the shutter release button 26, an AE/AF processing is performed.

The photographer manipulates as required the zooming lever 38 to zoom the lens 14 to adjust the angle of view. When the zooming lever 38 is turned upward (in the telescopic direction) and a zoom-in signal is entered into the CPU 110, the CPU 110 in response to this signal drives a zoom lens drive unit 144B to shift a zoom lens 14B in the telescopic direction. When the zooming lever 38 is turned downward (in the wide angle direction) and a zoom-out signal is entered into the CPU 110, the CPU 110 in response to this signal drives the zoom lens drive unit 144B to shift the zoom lens 14B in the wide angle direction.

After that, when the shutter release button 26 is full-pressed, an S2-on signal is entered into the CPU 110, and the CPU 110 starts photography and record processing. Thus, image data acquired in response to the S2-on signal are converted into luminance/color differential signals (Y/C signals) by the image signal processing circuit 134, and the converted signals, after going through a prescribed processing including gamma correction, are stored into the memory 120.

The image data stored on the memory 120, after being compressed into a prescribed format (e.g. the JPEG format) by a compressing/expanding circuit 146, are recorded onto a recording medium 150 via a medium controller 148. When the continuous shooting mode is selected, in response to the full pressing of the shutter release button 26, the CPU 110 controls each unit so as to acquire a prescribed number of still images at prescribed intervals.

If the playback mode is selected with the mode selector switch 50, image data (the image data last recorded on the recording medium 150) are read out of the recording medium 150. The read-out image data, after being expanded into non-compressed YC signals by the compressing/expanding circuit 146, are supplied to the monitor 30 via the image signal processing circuit 134, the character MIX circuit 135 and the video encoder 136. In this way, the image recorded in the recording medium 150 is reproduced and displayed on the monitor 30.

Frame-by-frame reproduction of an image is accomplished by manipulating the cross button 48. If the right side key of the cross button 48 is pressed, the next image data is read out from the recording medium 150, reproduced and displayed on the monitor 30. Or if the left side key of the cross button 48 is pressed, the preceding image data will be read out from the recording medium 150, reproduced and displayed on the monitor 30. At this occasion, if sound data is associated with the image data of the selected frame, the sound is reproduced in synchronization with displaying of the image.

In effect, the digital camera 10 is equivalent to anything that includes the image pickup function and the recording function as shown in FIG. 3. It is unnecessary for the camera to have an appearance as shown in FIGS. 1 and 2. Accordingly, the camera may be a personal computer or a PDA including the equivalent configuration of the block shown in FIG. 3. When a personal computer or a PDA does not include the image pickup function and the recording function, the image data and the sound data can be acquired from an external device through a memory or a network such as LAN, infrared communication and the Internet.

Figure 4:
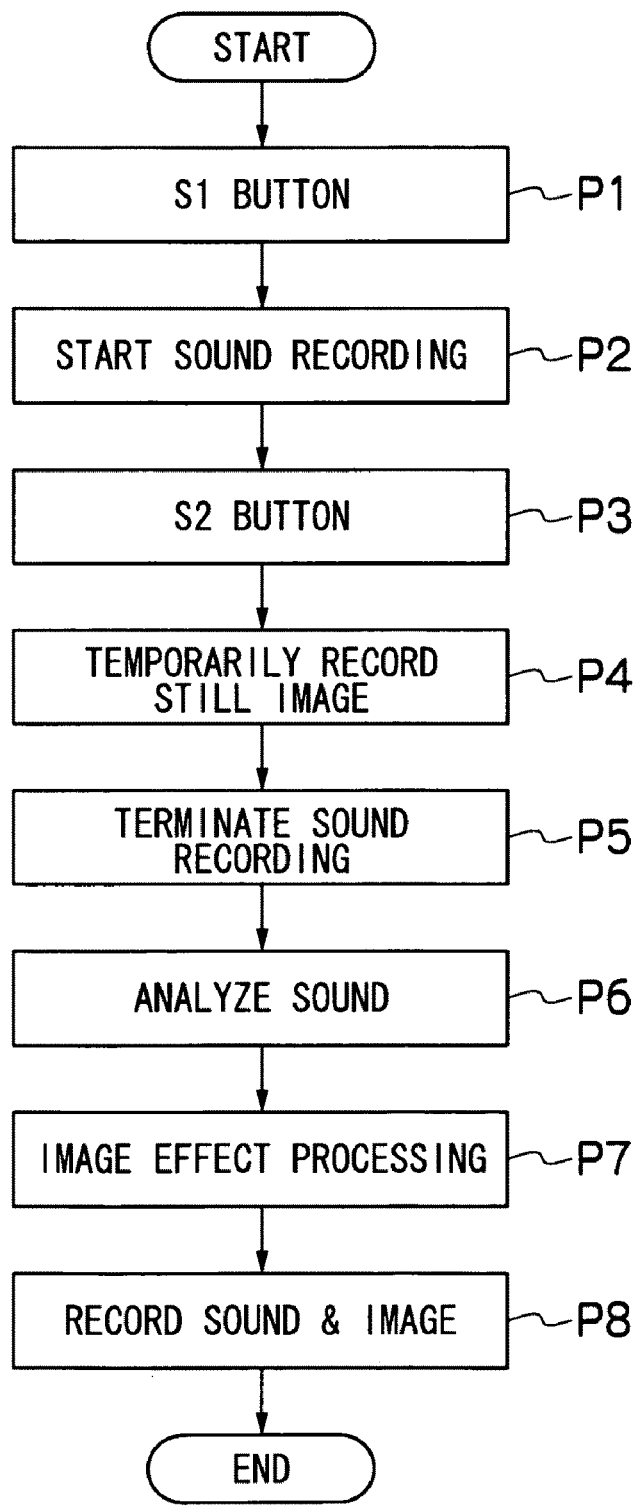
FIG. 4 is a flow chart of shooting processing according to a first exemplary embodiment.

FIG. 4 is a flow chart of photographing processing according to a first exemplary embodiment. The processing starts in response to activation of the still image shooting mode. This processing is controlled by the CPU 110. The program describing the processing is recorded in the ROM 116, and the CPU 110 reads out and executes the program.

In the step P1, it is determined whether or not the shutter release button 26 is half-pressed (S1-on). In response to the determination that the button is half-pressed (S1-on, S1 button pressed), the processing advances to the step P2.

In the step P2, pickup of a sound by the microphone 17 and processing and recording of the picked-up sound by the sound data processing circuit 149 are started. Instead, the recording of a sound may be started immediately in response to activation of the still image shooting mode.

In the step S3, it is determined whether or not the shutter release button 26 is full-pressed (S2-on). In response to the determination that the button is full-pressed (S2-on, S2 button pressed), the processing advances to the step P4.

In the step P4, operation of acquiring a still image for recording is executed, and the acquired image data is temporarily stored on the VRAM 122. At this point, the sound recording is continued.

In the step P5, the sound recording is continued for a prescribed time period (e.g. five seconds) after completion of the recording operation of a still image. In response to a lapse of the prescribed time period, the sound recording is terminated.

In the step P6, the CPU 110 instructs a sound analyzing circuit 151 to analyze the recorded sound. In response to the instruction by the CPU 110, the sound analyzing circuit 151 extracts feature data of the sound (sound volume, frequencies, or time series variations in them) recorded in the SDRAM 120 (or the recording medium 150), matches sound feature patterns (e.g. high or low volume level, long or short speech duration, high or low frequencies) recorded previously in ROM 116 and the extracted feature data with each other, and identifies a sound feature pattern corresponding to the extracted feature data. The identified sound feature pattern is then notified to an image effector 152.

In the step P7, the image effector 152 applies an image effect processing corresponding to the notified sound feature pattern on the still image for recording stored on the VRAM 122. In the step P8, the image on which the effect is applied and the sound stored on the memory 120 are recorded in association with each other, on the recording medium 150. The original image before the application of the effect may further be associated with them and recorded on the recording medium 150.

Figure 5A:
FIGS. 5A to 5D show examples of an original image and images on which effects have been applied acquired by the shooting processing according to the first exemplary embodiment.
Figure 5B:
Figure 5C:
Figure 5D:

For instance, when image data as shown in FIG. 5A is acquired and a scenic pattern of "festival" is notified, contrast enhancement is applied on the entire image as shown in FIG. 5B, or zooming in which areas around the perimeter of the image are blurred away and the focus is achieved only on the central area of the image is applied as shown in FIG. 5C in order to cause dynamic atmosphere matching a festival. Instead, processing may be executed such that an original image is shifted to any direction and the shifted image is superimposed on the original image, as shown in FIG. 5D.

Details of the effect may be anything that corresponds to the analytical results on the sounds. In addition to the above-mentioned details, any change in hues, sharpness, distortion, contrast or blurredness may be adopted.

FIGS. 6A to 6D illustrate an example of a correspondence between an analytical result on a sound and effect processing to be executed by the image effector 152 in response to notification of the analytical result on the sound. The details of the effect shown in the figure is an exemplary one. A part or all of them can be combined. Instead of radially blurring, as a geometrical effect, blurring to the rotational direction may be adopted.

When the playback mode is set, the image and the sound recorded in association with each other on the recording medium 150 are reproduced in synchronization with each other according to the association. More specifically, when reproduction of a desired image is selected, the image is converted into a video signal and outputted on the monitor 30, and concurrently the sound data associated with the image is converted into an analog sound signal and outputted from the loudspeaker 35.

Thus, the sound is recorded during shooting of the still image, an effect in accordance with the analytical result on the recorded sound is applied on the still image, and the sound and the still image on which the effect is applied are recorded in association with each other, thereby enabling the image to be recorded with realism together with the sound. The still image and sound are reproduced in association with each other, thereby enabling a viewer to feel an ambience and realism close to a memory that the photographer felt.

Second Exemplary Embodiment

In the digital camera 10 according to the first exemplary embodiment, following procedures may be taken to preferably record a sound required for feeling a memory.

Figure 7:
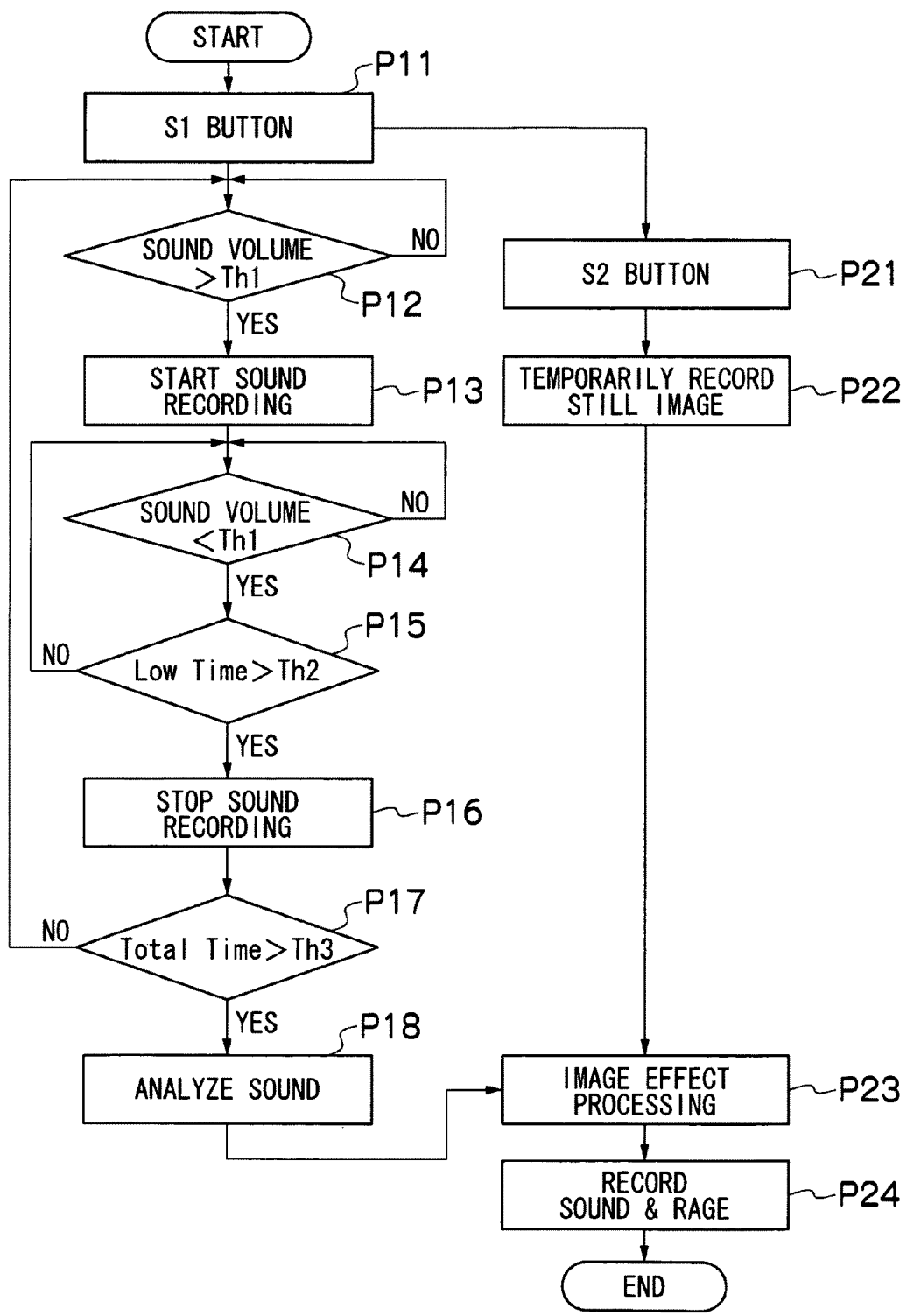
FIG. 7 is a flow chart of a shooting processing according to a second exemplary embodiment.

FIG. 7 is a flow chart of shooting processing according to a second exemplary embodiment. This processing starts in response to activation of the still image shooting mode. The processing is controlled by the CPU 110. The program describing the processing is recorded in the ROM 116, and the CPU 110 reads out and executes the program.

In the step P11, it is determined whether or not the shutter release button 26 is half-pressed. When the button is half-pressed, sound recording processing in the steps P12 to P18 and image recording processing in the steps P21 to P24 advance concurrently.

In the step P12, it is determined whether or not the sound volume exceeds the prescribed threshold value Th1 (e.g. 50 phons). When the determination is YES, the processing advances to the step P13. When the determination is NO, the determination is repeated.

In the step P13, the sound recording starts.

In the step P14, it is determined whether or not the sound volume falls below the prescribed threshold Th1. When the determination is YES, the processing advances to the step P15. When the determination is NO, the determination is repeated.

In the step P15, it is determined whether or not a duration time "Low Time" exceeds a prescribed threshold Th2 (e.g. ten seconds), concerning the time when the sound volume falls below the prescribed threshold Th1 as a starting time. When the determination is YES, the processing advances to the step P16. When the determination is NO, the determination returns to the step P14.

In the step P16, the sound recording is stopped.

In the step P17, it is determined whether or not a time period "Total Time" exceeds a prescribed threshold Th3 (e.g. five minutes), concerning the time when the sound recording starts as a starting time and concerning the last time when the sound recording stops as an ending time. When the determination is YES, the processing advances to the step P18. When the determination is NO, the determination returns to the step P12.

The step P18 is as with the step P6. The steps P21 to P24 are as with the steps P3, P4, P7 and P8, respectively. When the "Total Time" exceeds the prescribed threshold Th3 without the sound volume falling below the threshold Th1 in the step P14, the processing exits the loop of the step P14, advances the step P16, and the sound recording is terminated.

Figure 8:
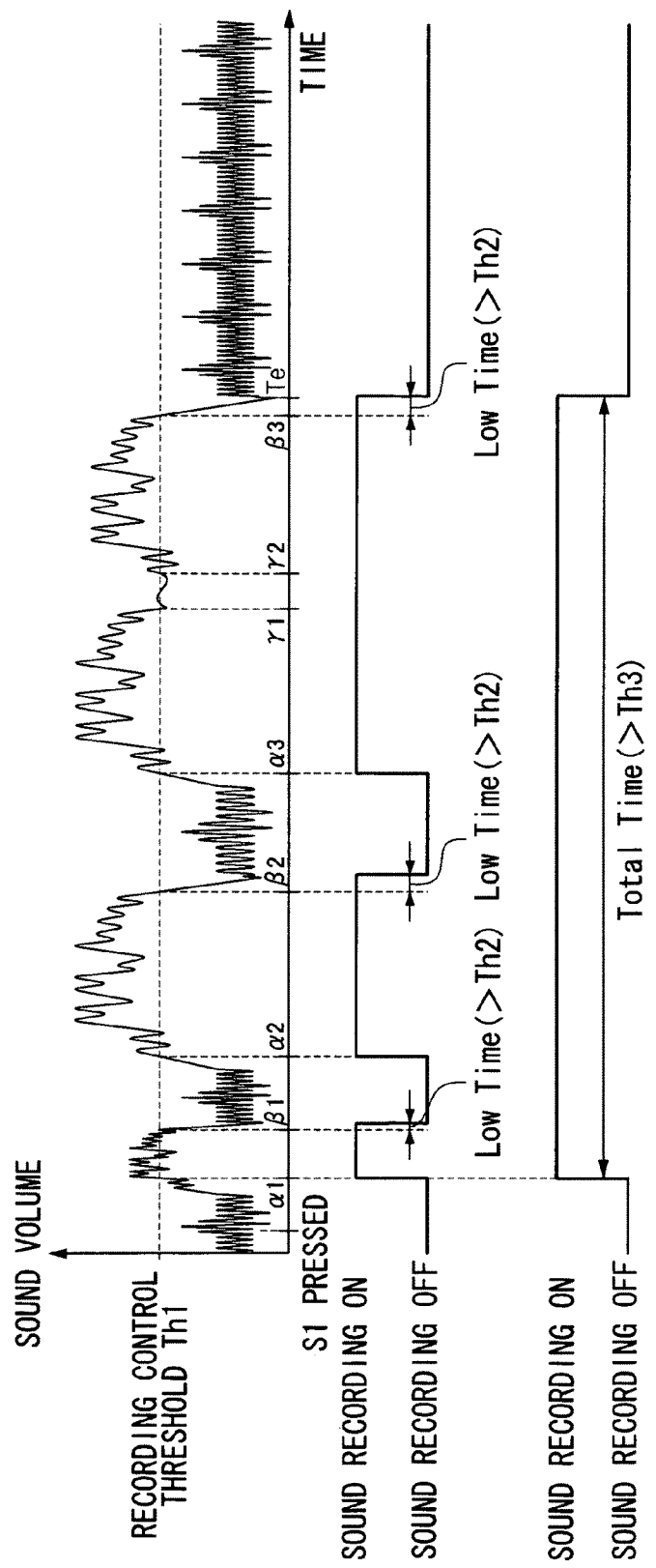
FIG. 8 shows an example of a timing chart concerning start/termination of sound recording performed according to sound recording processing.

FIG. 8 is an example of a timing chart of start/stop of the sound recording executed according to the sound recording processing in the steps P12 to P18.

As shown in FIG. 8, at points in time α1, α2, and α3, the sound volume exceeds the threshold Th1 (step P12: YES), and the sound recording starts (step P13).

At each of points in time β1, β2 and β3, the sound volume falls below the threshold Th1 (step P14: YES), and then the sound recording is stopped (step P16) at each of subsequent points in time (β1+Th2, β2+Th2 and β3+Th2), the points in time when the time period "Low Time" measured from the corresponding points of β1, β2 and β3, during which the sound volume remains below the threshold Th1, reaches the threshold Th2 (step P15: YES). If the time period during which the sound volume remains below the threshold Th1 does not reach the threshold Th2, for instance in a time period from γ1 to γ2, the sound recording is not stopped.

The total time period of sound recording "Total Time" exceeds the threshold Th3, thereby starting the analysis on the sound recorded during this duration.

Because this can avoid recording in silence to the utmost and the analyzed feature of the sound becomes easy to figure out, the effect on an image based on the analytical result on a sound can appropriately be applied.

The timing of the start, stop, restart and termination are not necessarily determined based on the sound volume. Instead, it may be determined based on the frequencies, frequencies and sound, or the time-series analysis thereon. For instance, the sound recording can be started when a sound of a prescribed frequency is detected. More specifically, it is said that the frequency of a baby voice is three kHz. When a sound having a frequency of three kHz is detected, it may be assumed that a baby is about to be photographed, and the sound recording may be started.

Since the sound recording is thus started, stopped, restarted and terminated according to states of the sounds, only a part necessary to recollect a memory can be recorded, without waste, and the effect on the image becomes what correctly reflects the state of the sound.

Third Exemplary Embodiment

A variety of effects may be applied on the acquired still image, frames of moving images may be created, and moving images may be created by arranging the frames in time sequence.

Figure 9:
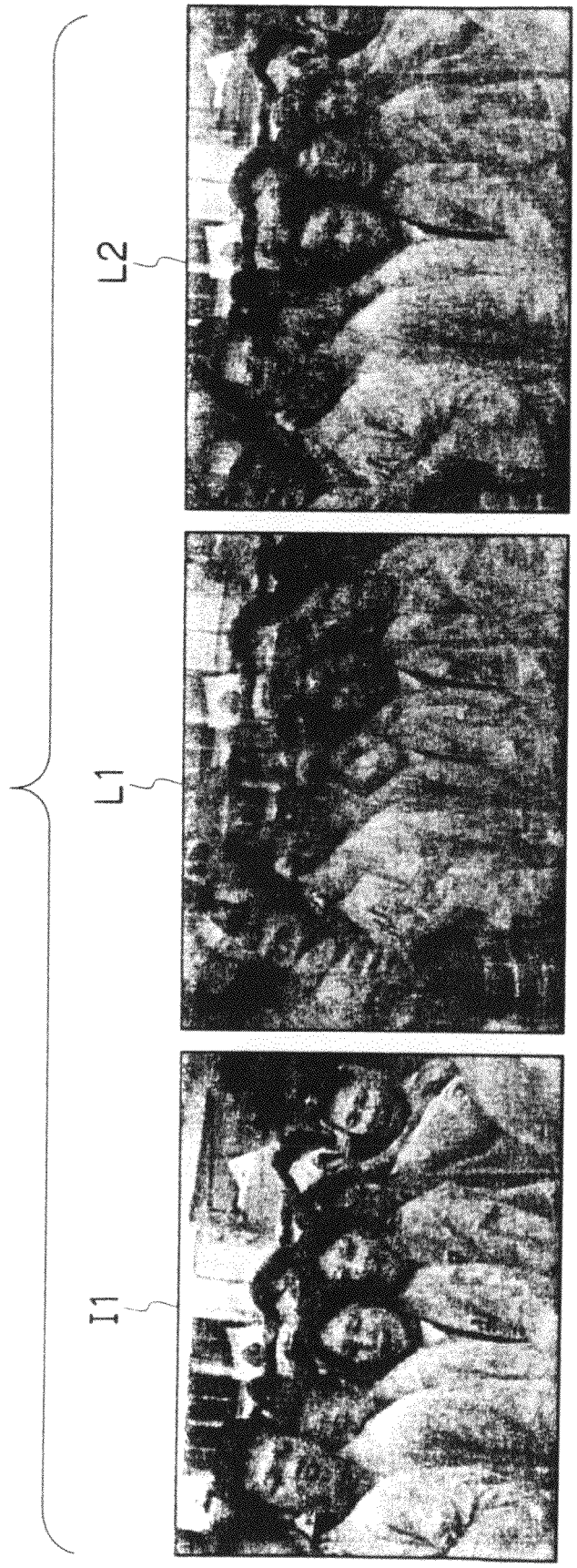
FIG. 9 shows an example of frames of a moving image.

For instance, as shown in FIG. 9, an original image I1 is shifted right or left, upward or downward, or diagonally, and is superimposed on the original image to make image frames L1 and L2. A moving image is created by alternately arranging a prescribed number (e.g. 100 frames) of the images L1 that have been shifted left and the images L2 that have been shifted right. Any recording system, including Motion JPEG, may be adopted to record the moving image.

Figure 10:
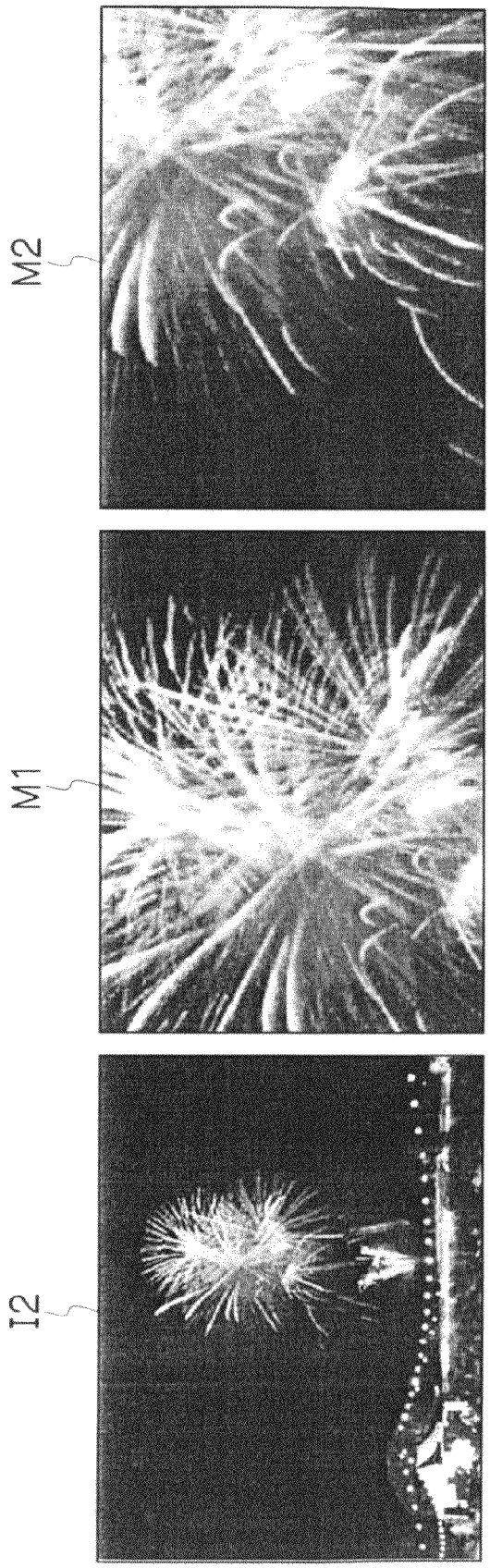

Instead, as shown in FIG. 10, image frames M1 and M2 may be created by zooming in on a portion having high luminance in an original image I2.

The created moving image data are then recorded on the recording medium 150 in association with the sound on the memory 120.

When the moving image is reproduced, the associated sound is concurrently reproduced, thereby enhancing reality at the time of shooting.

Fourth Exemplary Embodiment

A pseudo-moving image frame may be created by, when continuous shooting, which is operation acquiring a prescribed count of still image data in prescribed intervals (e.g. continuous three frames in a time interval of 0.45 second), is performed, and applying an effect that combines and superimposes a part or the whole of the prescribed count of images.

Figure 11:
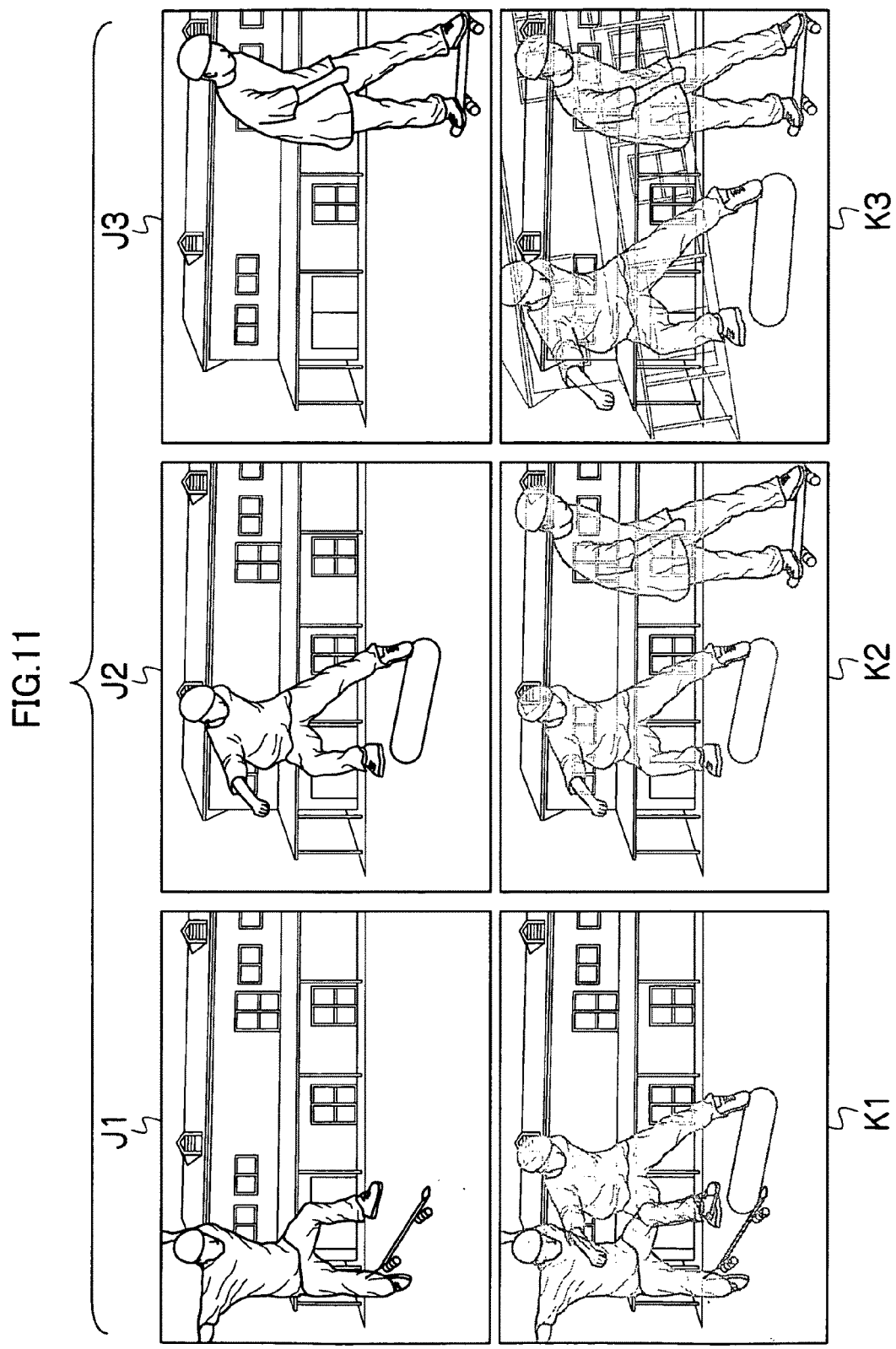
FIG. 11 shows an example of an effect processing on continuous images.

For example, as shown in FIG. 11, when three images J1, J2 and J3 are acquired by continuous shooting, an image K1 is created by superimposing main subject portions (portions having high luminance) of the images J1 and J2, an image K2 is created by superimposing main subject portions (portions having high luminance) of the images J2 and J3, an image K3 is created by superimposing main subject portions (portions having high luminance) of the images J3 and J2. The still images K1 to K3 continuously show the movement of the subject. The transitional movement of the subject can be grasped, as with a moving image, by reproducing the images K1 to K3 according to the sequence concerning the shooting of the original images. The still images K1 to K3 are stored on the recording medium 150 in association with the sounds. The reproduction of the still images K1 to K3 may be transitionally conducted as with a slideshow. At this point, the associated sounds are continuously reproduced in the same manner as described above. Thus, the group of images showing a continuous movement of the subject is stored in association with the sounds, thereby allowing a user to enjoy the images and the sounds with realism concerning the shooting.

Fifth Exemplary Embodiment

In the first to fourth exemplary embodiments, it is not necessary to record the sound picked up by the microphone as it is. Instead, the content of the sound may appropriately be edited and recorded together with the image.

Figure 12A:
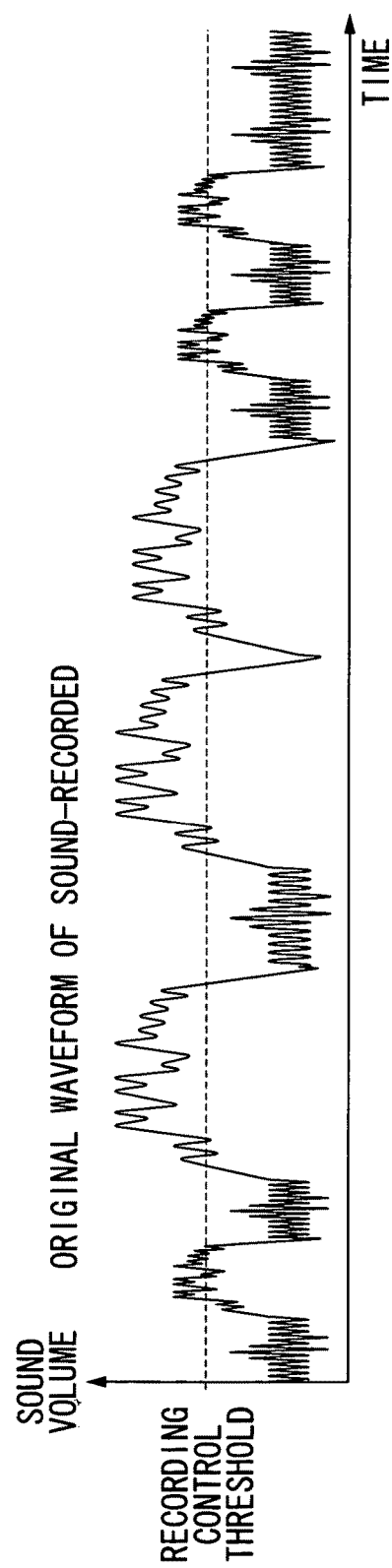
FIGS. 12A to 12C schematically show states where an original sound has been edited.
Figure 12B:
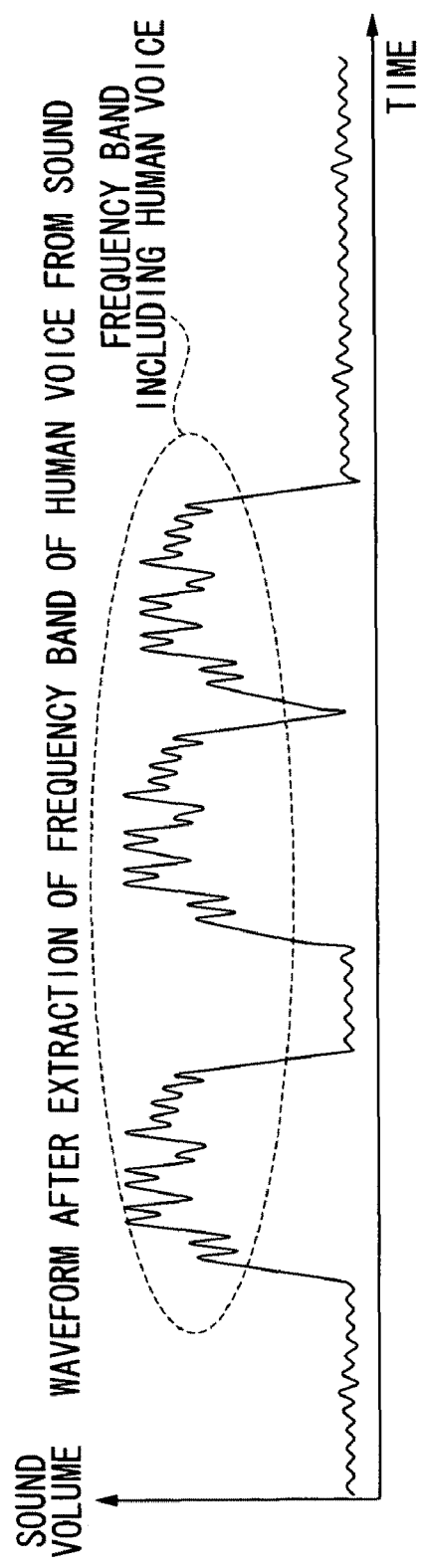
Figure 12C:
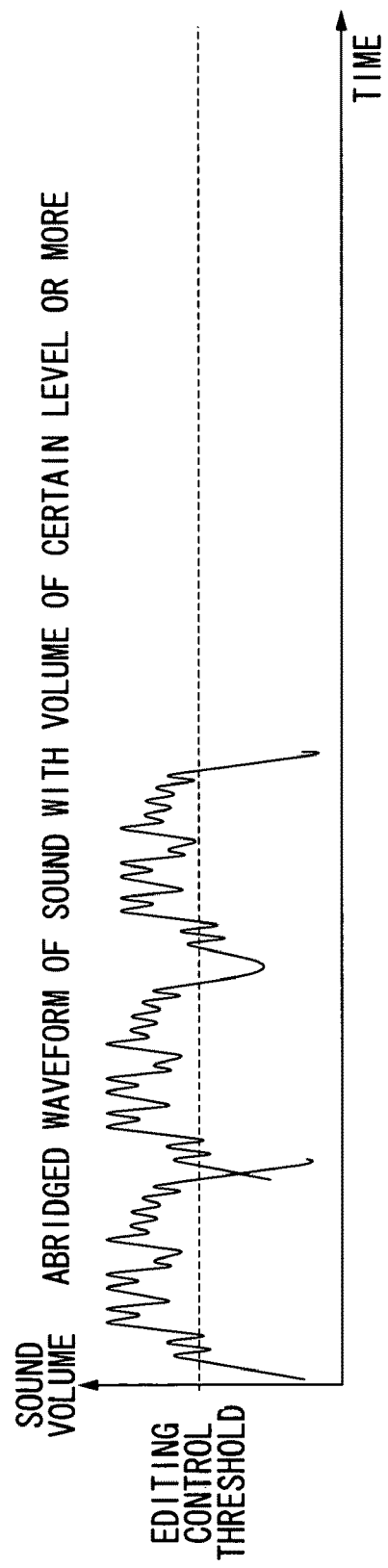

For instance, using a digital filter, only a sound in a prescribed frequency band (e.g. in a case of a human voice: 300 Hz to 3500 Hz) is extracted from the original sound (see FIG. 12A) and recorded. Instead, noise components are eliminated and the sound without noise is recorded. Instead, using ICA (Independent Component Analysis) and so forth, the voice of a specific person is extracted from the original sound and recorded (see FIG. 12B). Instead, sound components having a sound waveform louder than a prescribed value are extracted from the original sound, and the components are connected together (see FIG. 12C), thereby allowing the amount of data to be reduced and the data to be neatly contained within the recording time period previously determined.

Sixth Exemplary Embodiment

In the first to fifth exemplary embodiments, an effect may be applied on an image according to analytical results on rotational signals from the gyro sensor 86 and the magnitude of vibration (the shake amount) of the camera body 12 computed by the shake correction processing circuit 87 based on the rotational signals.

Figure 14:
FIG. 14 shows an example where an effect processing is applied on an original image based on a parameter according to shake amount.

For example, as shown in FIG. 13, provided that the shake amounts are computed along the time axis, and reference numerals t1, t2, t3, t4 and t5 designate the respective time intervals during which the shake amount greater than or equal to a prescribed threshold X is computed. If the shutter release button 26 is full-pressed in any one of the time intervals t1, t2, t3, t4 and t5, the effect is applied on the image according to the shake amount during time interval in which the timing of the full press is involved (full press interval). The parameters of the effect are set such that, for instance, in proportion to the shake amount when full-pressing, a specific portion of the image is enlarged or reduced by an enlargement/reduction ratio the zoom in speed or zoom out speed is changed, the amount of shift is changed, the turning ratio is changed, turning rate is changed and so forth. In FIG. 14, images I2 and I3 are created by combining a zooming-in image on the original image I1 and the original image, thereby expressing dynamic movement with a lively feeling corresponding to the situation where the shake occurred during shooting.

Instead, if the shake amount exceeds the threshold X at least one time in a time period from the half pressing to the full pressing, an effect, for instance, appeal, crawl, strip, slide, dissolve, wipe or the like, may be applied on the image.

The enlargement or reduction ratio of an image, zooming ratio (reduction ratio and magnification ratio), amount of shift, shift rate, turning ratio, turning speed or the like may be changed according to low/high variations in sound volume and the rate of variations. An effect, for instance, appeal, crawl, strip, slide, dissolve, wipe or the like, may be applied on the image according to the feature of the frequencies of the sound.

Various kinds of shooting status detection devices, e.g. a thermal sensor, a pressure sensor etc., may be provided instead of the gyro sensor 86, or in addition to the gyro sensor 86, and an effect is applied according to the amounts concerning status detected by the shooting status detection devices. For instance, the grip strength on the camera body 12 is detected by the pressure sensor, and a parameter of effect according to the pressure is set.

Thus, not limited to the sound, an effect is applied on an image according to various kinds of physical quantities that can be detected from the external environment, and an image having reality at the time of shooting can be created.

Seventh Exemplary Embodiment

In the first to sixth exemplary embodiment, it may be further configured such that a specific movement performed intentionally by the photographer is detected and a specific effect is applied according to the physical quantity of the specific movement.

Figure 15:
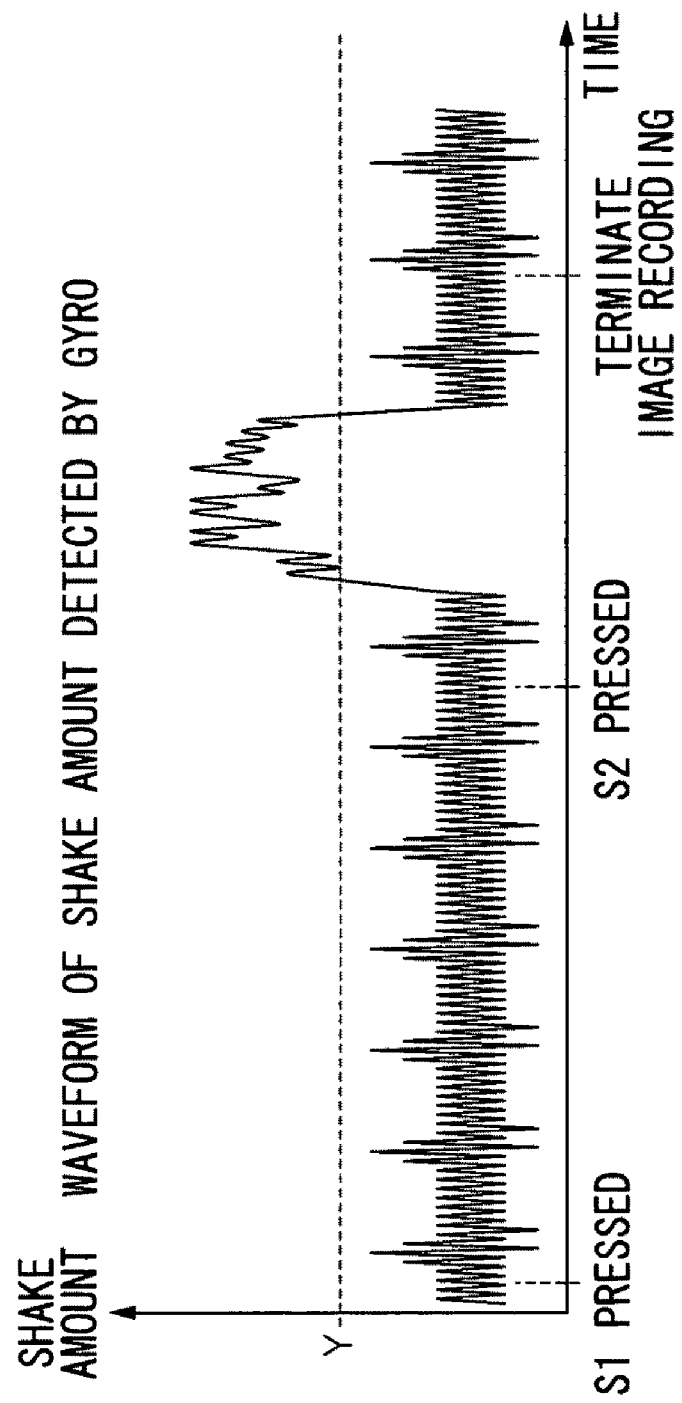
FIG. 15 schematically shows time-series variations when a camera body is momentarily shaken.

For instance, provided that the photographer momentarily shakes the camera body 12 after full pressing of the shutter release button 26. In this case, as exemplarily shown in FIG. 15, an abrupt variation (pulse) in the shake amount exceeding a threshold Y arises in an interval Ta after full pressing of the shutter release button 26.

Figure 16C:
FIGS. 16A to 16C show examples of an effect processing when a camera body is momentarily shaken.
Figure 16B:
Figure 16A:

When the original image as shown in FIG. 16A is taken in response to full-pressing of the shutter release button 26, an image M1 is created by combining a zooming-in image of the original image and the original image I1 as shown in FIG. 16B. The image M1 represents the situation where the image is photographed with the camera abruptly being shaken, and has reality.

Instead, when the photographer momentarily pushes the camera body 12 forward after full-pressing of the shutter release button 26, the direction of pushing and the amount of pushing are detected by an acceleration sensor or the like. When a prescribed amount of forward pressing or more is detected, an effect of zooming-in is applied on the original image I1 as shown in FIG. 16C to acquire an image M2. The image M2 represents the situation where the image is photographed with the camera being abruptly pressed forward, and has reality.

Instead, when the photographer grips the camera body 12 after full-pressing of the shutter release button 26, the grip strength on the camera body 12 can be detected by the pressure sensor. If the pressure reaches a prescribed threshold (e.g. 10 kg/cm$^2$ or more), an effect of zooming-in may be applied on the original image I1. Instead, when the photographer's body temperature transferred by grasping the camera body 12 by the photographer is detected by the thermal sensor after full-pressing of the shutter release button 26 and the temperature is higher than or equals to a prescribed threshold (e.g. 30 degrees centigrade or more), an effect of turning may be applied on the original image I1.

The timing when the photographer makes the digital camera 10 detect the specific movement may arbitrarily be selected. The timing may be before or after full pressing of the shutter release button 26. For instance, when the camera is shaken during reproduction of the original image, an image that is combination of a zooming-in image on the original image and the original image may be created. Thus, a specific image effect is intentionally created at any point of time.

While examples and embodiments of the present invention have been explained in detail, the present invention is not limited to the above, needless to say, various improvements and modifications may be added without departing from the scope of the present invention.

What is claimed is:

1. An imaging apparatus, comprising:
   an imaging unit which converts an electric signal into image data and outputs the image data, the electric signal being acquired by an image pickup element photoelectrically converting light from an image of a subject formed through an imaging lens on a photosensitive surface of the image pickup element;
   a sound acquiring unit which converts a sound which represents circumstances around the subject into sound data and outputs the sound data;
   a sound analyzing unit which analyzes a feature of the sound based on the sound data outputted from the sound acquiring unit;
   an effect application unit which applies an effect on the image data outputted from the imaging unit, the effect comprising an image processing in accordance with the feature of the sound analyzed by the sound analyzing unit; and
   a recording unit which associates the image data generated by applying the effect by the effect application unit with the sound data outputted from the sound acquiring unit and records the image data and the sound data on a prescribed recording medium,
   wherein the feature of the sound comprises a volume of the sound a duration of the sound, and a frequency of the sound, and
   wherein each of a different combination of the volume of the sound, the duration of the sound, and the frequency of the sound causes the effect application unit to apply a different unique combination of hue, sharpness, and contrast as the image processing.

2. The imaging apparatus according to claim 1, wherein the effect includes image processing which changes at least one of a hue, a sharpness, a contrast, and a blurredness of the image.

3. The imaging apparatus according to claim 1, wherein the sound analyzing unit extracts the volume of the sound, the frequency of the sound, or a time-series variation thereof as the feature of the sound, compares the extracted feature of the sound with a previously-stored feature pattern, and applies the effect which is previously associated with a feature pattern matching the extracted feature of the sound.

4. The imaging apparatus according to claim 1, further comprising a sound acquisition control unit which controls a timing of a start, a stop of a conversion and the output of the sound data by the sound acquiring unit in accordance with the feature of the sound analyzed by the sound analyzing unit.

5. The imaging apparatus according to claim 4, wherein the sound acquisition control unit starts outputting the sound data when detecting that the volume of the sound becomes larger than or equal to a prescribed value, terminates outputting the sound data when outputting the sound data over a prescribed first time period, or when the volume of the sound falls equal to or below the prescribed value and the falling continues over a prescribed second time period.

6. The imaging apparatus according to claim 1, further comprising a moving image creating unit which creates image frames of a moving image by applying a plurality of different effects on the image data outputted from the imaging unit, and creates moving image data based on the image frames,
   wherein the recording unit associates the moving image data created by the moving image creating unit and the sound data with each other and records the associated data.

7. The imaging apparatus according to claim 1, further comprising a continuous shooting control unit which controls the imaging unit to output a prescribed count of the image data at prescribed time intervals,
   wherein the effect application unit executes image processing on the prescribed count of image data outputted from the imaging unit using the image data and another image data captured before and/or after the image data in accordance with a control of the continuous control unit.

8. The imaging apparatus according to claim 1, further comprising a sound editing unit which edits a content of the sound data from the sound acquiring unit in accordance with the feature of the sound analyzed by the sound analyzing unit.

9. The imaging apparatus according to claim 8, wherein the sound editing unit performs at least one of extracting a specific frequency from the sound data, eliminating noise, extracting a sound of a specific person, and cutting off sound data whose sound volume does not reach a prescribed sound volume.

10. The imaging apparatus according to claim 1, further comprising a detection unit which detects a physical status of the imaging apparatus,
    wherein the effect application unit applies the effect in accordance with the physical status detected by the detection unit.

11. The imaging apparatus according to claim 10, wherein the effect application unit applies a specific effect in accordance with a specific physical status detected by the detection unit.

12. The imaging apparatus according to claim 1, wherein the effect application unit changes at least one of a magnification ratio, a zooming speed, an amount of shift, a shift rate, a turning ratio, and a turning speed in a processing of the effect on the image in accordance with a variation of the volume of the sound or a rate of variation of the sound.

13. The imaging apparatus according to claim 1, wherein the sound analyzing unit extracts the feature of the sound, compares the extracted feature of the sound with a previously-stored feature pattern, and applies the effect which is previously associated with a feature pattern that matches the extracted feature of the sound.

14. The imaging apparatus according to claim 1, further comprising a sound editing unit which performs at least one of extracting a specific frequency from the sound data, eliminating noise, and extracting a sound of a specific person to edit a content of the sound data from the sound acquiring unit in accordance with the feature of the sound analyzed by the sound analyzing unit.

15. The imaging apparatus according to claim 1, wherein said each of the different combination of the volume of the sound, the duration of the sound, and the frequency of the sound causes a different blurredness for the image.

16. A reproducing apparatus reproducing image data and sound data in association with each other, the image data and sound data being recorded on a prescribed recording medium by the imaging apparatus according to claim 1.

17. An imaging method, comprising:
    converting an electric signal into image data and outputting the image data, the electric signal being acquired by an image pickup element photoelectrically converting light from an image of a subject formed through an imaging lens on a photosensitive surface of the image pickup element;
    converting a sound which represents circumstances around the subject into sound data and outputting the sound data;

analyzing a feature of the sound based on the outputted sound data;

applying an effect on the outputted image data, the effect comprising an image processing in accordance with the analyzed feature of the sound; and associating the image data generated by applying the effect with the outputted sound data and recording the image data and the sound data on a prescribed recording medium, wherein the feature of the sound comprises a volume of the sound, a duration of the sound, and a frequency of the sound, and wherein each of a different combination of the volume of the sound, the duration of the sound, and the frequency apply different unique combination of hue, sharpness, and contrast as the image processing.

18. A reproducing method reproducing image data and sound data in association with each other, the image data and sound data being recorded on a prescribed recording medium by the imaging method according to claim 17.

19. A non-transitory computer-readable storage medium encoded with a computer program, the program comprising computer-executable instructions of:

acquiring image data and sound data recorded concurrently with the image data said sound data being converted from a sound which represents circumstances around a subject of the image data;

analyzing a feature of the sound based on the sound data;

applying an effect on the image data, the effect comprising an, image processing in accordance with the analyzed feature of the sound; and reproducing image data generated by applying the effect and the sound data in association with each other, wherein the feature of the sound comprises a volume of the sound, a duration of the sound, and a frequency of the sound, and wherein each of a different combination of the volume of the sound, the duration of the sound, and the frequency of the sound causes the applying to apply a different unique combination of hue, sharpness, and contrast as the image processing.

* * * * *